United States Patent [19]

Reinmold et al.

[11] 4,325,188

[45] Apr. 20, 1982

[54] TRACING TABLE FOR RECORDING THE PROGRAM FOR AN AUTOMATIC MACHINE, IN PARTICULAR FOR CUTTING GLASS

[75] Inventors: Heinz-Josef Reinmold; Josef Audi, both of Aachen, Fed. Rep. of Germany

[73] Assignee: Saint Gobain Industries, Neuilly-sur-Seine, France

[21] Appl. No.: 92,972

[22] Filed: Nov. 9, 1979

[30] Foreign Application Priority Data

Nov. 18, 1978 [DE] Fed. Rep. of Germany ....... 2850127

[51] Int. Cl.³ .............................................. G09G 3/00
[52] U.S. Cl. ................................. 33/1 M; 33/125 M
[58] Field of Search ................... 33/189, 125 R, 1 M, 33/1 C, 125 M

[56] References Cited

U.S. PATENT DOCUMENTS

| | | | |
|---|---|---|---|
| 3,403,263 | 9/1968 | Hargens | 33/1 C |
| 3,438,133 | 4/1969 | Brault | 33/1 M |
| 3,602,638 | 8/1971 | Pascoe . | |

FOREIGN PATENT DOCUMENTS

| | | |
|---|---|---|
| 866253 | 2/1953 | Fed. Rep. of Germany ... 33/125 M |
| 1596389 | 10/1970 | Fed. Rep. of Germany . |
| 2646062 | 11/1978 | Fed. Rep. of Germany . |
| 2646053 | 5/1979 | Fed. Rep. of Germany . |

Primary Examiner—William D. Martin, Jr.
Attorney, Agent, or Firm—Pennie & Edmonds

[57] ABSTRACT

A Cartesian coordinate tracing table for entering a program into a memory of an automatically controlled machine. The tabel has guide bars extending in the X and Y directions. Two rotary generators which are responsive to movement of a cursor in the X and Y directions generate electrical signals for transmission to a memory. One rotary pulse generator is mounted on a carriage movable along the guide bar extending in the X direction. The other rotary pulse generator is mounted on a cursor slidable along the guide bar extending in the Y direction which in turn is mounted on the carriage. Each rotary pulse generator includes a rotatable shaft having a driving roller which contacts a guide bar to provide the driving force to the generator.

7 Claims, 3 Drawing Figures

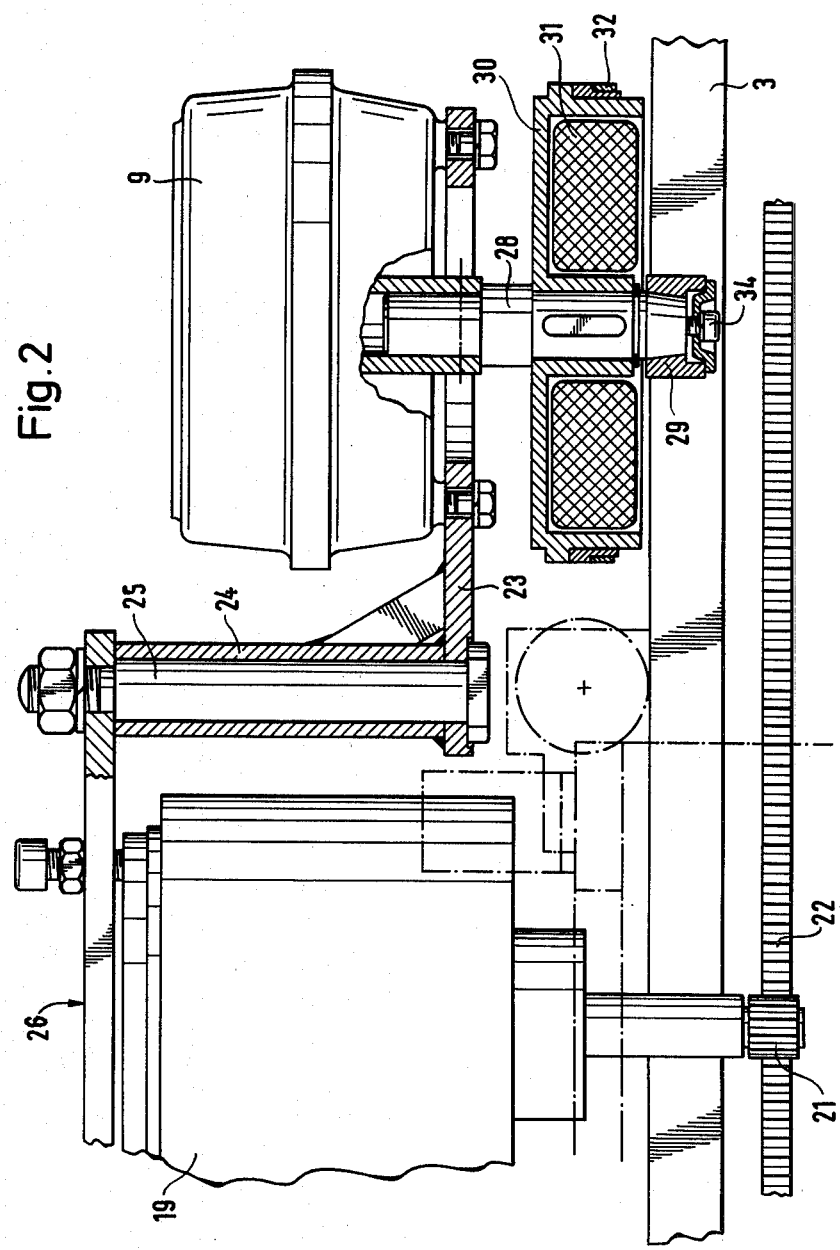

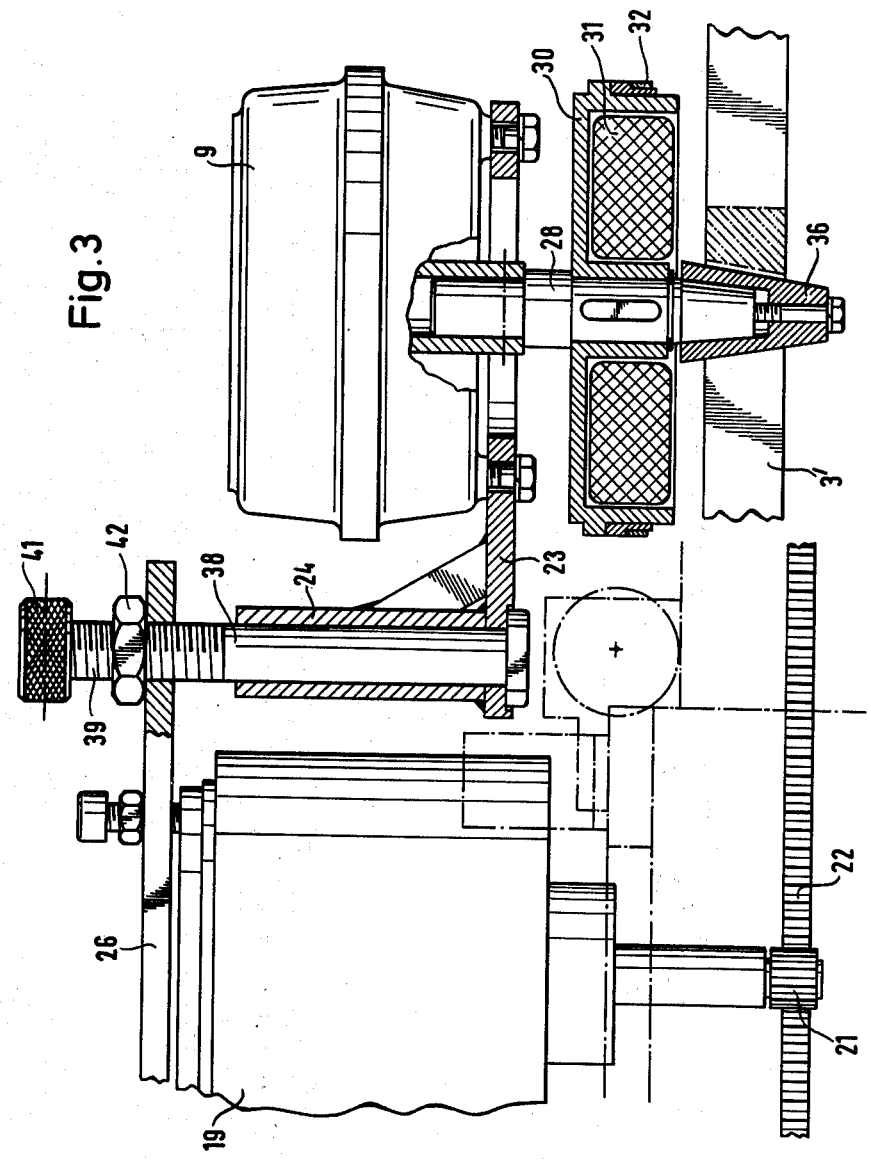

TRACING TABLE FOR RECORDING THE PROGRAM FOR AN AUTOMATIC MACHINE, IN PARTICULAR FOR CUTTING GLASS

FIELD OF THE INVENTION

The invention relates to a Cartesian coordinate tracing table for recording a program from a pattern or drawing for an automatically controlled machine, and more particularly, for the storage in a memory of a program of a cutting machine for cutting glass sheets where the cutting machine is equipped with a Cartesian coordinate control. Such tables comprise a carriage or cursor equipped with a sensing head which when guided along the outline of the pattern to be reproduced drives two numerical pulse generators, one for the X coordinate and the other for the Y coordinate.

BACKGROUND OF THE INVENTION

A numerically controlled machine operating on the basis of X-Y Cartesian coordinates for cutting of glass sheets is disclosed in French Pat. No. 2,367,710. The machine is equipped with a carriage mounted at the intersection of two slides which form bridges between two coordinate guide bars, each slide being driven by a motor attached to the frame of the machine. Each motor drives a slide along one of the coordinate guide bars by means of a timing belt. The memory supplying the data of the cutting program comprises a magnetic tape on which the pulses controlling the driving motors are recorded, for example in the manner described in the publication of French Pat. No. 2,368,074. The magnetic tape can be replaced by the memory of a microcomputer.

This French patent also discloses using the cutting machine itself for recording the program on the magnetic tape by utilizing the cutting head of the carriage as a sensing head for guiding the carriage along a desired contour. In addition the patent discloses use of numerical pulse generators in the form of rotating devices which are placed directly on the shafts of the stationary motors.

If the Cartesian coordinate machine is used for producing the program, i.e. if the motion is transmitted by timing belts between the stationary motors and the sliding elements, an unavoidable stretching of the belts occurs such that slight tracing errors are introduced particularly if the dimensions of the machine are large. These errors may be a nuisance if cutting has to be done with very high precision.

In order to increase the precision of a cutting program, it is therefore desirable to create a separate recording device which is adapted to the specific parameters of the cutting machine to be used and which best meets the conditions required for the cutting of plate glass, particularly with respect to tracing precision.

GENERAL DESCRIPTION OF THE INVENTION

A tracing table for recording a program according to the invention is characterized generally in that rotary pulse generators are used. One generator which records the abscissae is positioned on a carriage moving along the guide bar corresponding to the X-axis. The second generator, which records the ordinate is positioned on a cursor which moves on the carriage along the guide bar corresponding to the Y-axis. Rotatable shafts to which the pulse generator are connected are equipped with rollers which are driven by friction against the coordinate guide bars such that a pulse generator will provide a program signal as it is moved along a guide bar.

Since the driving force to the pulse generator is transmitted by means of a driving roller running along a rigid slide and not by means of a timing belt, errors connected with a possible stretching of the timing belts is eliminated.

Preferably the driving rollers are equipped with permanent magnets or electromagnets while the guide bars on which the rollers rotate are made of ferromagnetic material. The pressure required for creating friction between the driving roller and the guide bar is therefore created solely by a direct acting magnetic coupling force without any effect on the shaft of the pulse generator. This results in no noticeable force being exerted on the bearing mounting the pulse generator which in turn lengthens the life of the bearing and increases the precision of the program. The magnetic coupling force also reduces the danger of sliding between the guide bar and the driving roller.

In one embodiment of the invention, the driving rollers are cylindrical and interchangeable with other similar rollers having a different diameter. The replacement of one roller by another and the direct coupling by friction make it possible to increase or decrease, as desired, the number of pulses which define the line to be traced and thus to proportionally lengthen or shorten the path described by the tool of the automatic cutting machine in relation to the outline of the pattern. This can be done in the direction of one of the coordinates or of both and thus makes it possible to correct tracing errors caused by stretching of a timing belt of the cutting machine by rerecording the program with the aid of a driving roller the diameter of which has been changed according to observed errors.

As one dimension of a cutting device is usually much larger than the other, errors caused by the stretching of the timing belts of the cutting device in the direction of the two coordinate axes are usually not equal. This defect can be easily and effectively corrected by using rollers of different size on the two pulse generators of the tracing table with each roller chosen so that it compensates for the observed error.

The same result as described above can be obtained in a further embodiment of the invention by use of conical driving rollers if the distances between the pulse generators and the guide bars are changed such that zones of the rollers which have different diameters make contact with the guide bars. In this manner continuous adjustment can be obtained.

Changing the diameter of the driving rollers also makes it possible to change the cutting program in a simple manner in order to obtain sheets of glass for which one or even both dimensions differ in a predetermined manner from those of the pattern. In this manner a large number of different contours can be obtained from a smaller number of patterns. This is of particular advantage when cutting pairs of sheets of glass which are subsequently bent and assembled for making safety glass, for instance an automotive windshield. If, for example, a piece of safety glass with cylindrical curvature is to be manufactured, the sheet of glass on the convex side must be longer in the curved direction than the sheet on the concave side. In the present state of the art, it is necessary to use two different patterns or, according to another solution known from German Pat. AS No. 26 03167, to use a complicated electronic computing device for obtaining the cutting program for at least one of the glass sheets, i.e. the larger one. In the present invention the desired result is obtained simply by replacing the roller for one of the coordinates by a smaller one or by changing the adjustment of that roller.

BRIEF DESCRIPTION OF THE DRAWINGS

FIG. 2 is a vertical section of a pulse generator with cylindrical rollers used with the tracing table of FIG. 1; and FIG. 3 is a cross-section of a pulse distributor similar to that of FIG. 2 but utilizing conical rollers instead of cylindrical rollers.

BEST MODES FOR CARRYING OUT THE INVENTION

Figure 1:
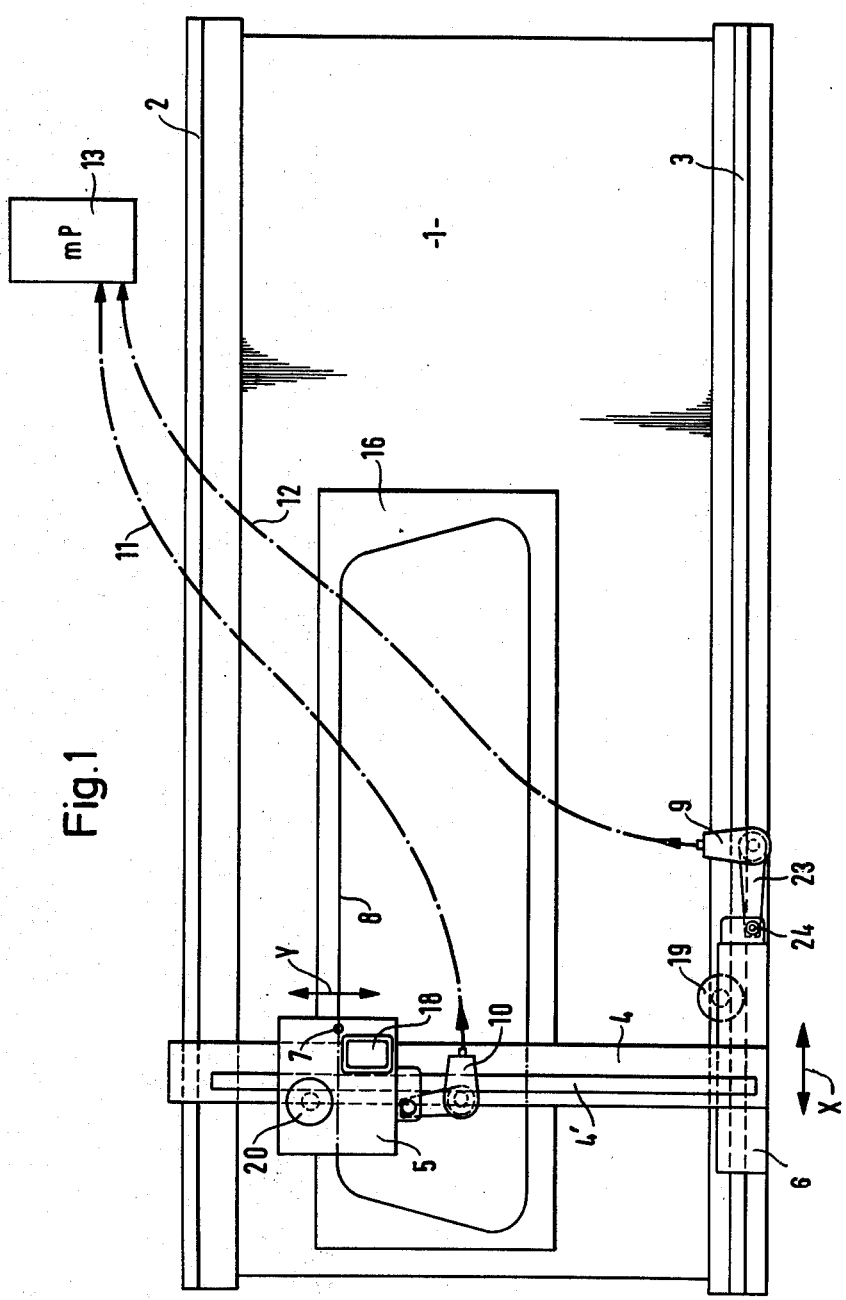
FIG. 1 is a plan view of a tracing table constructed according to the invention.

Referring to FIG. 1, there is illustrated a Cartesian coordinate tracing table 1 having coordinate slides or guide bars 2 and 3 extending lengthwise of the table. A carriage 4 is movable along guide bars 2 and 3 in the X direction, and a cursor 5 is movable along guide bar 4' mounted on carriage 4 in the Y direction. Carriage 4 is guided along guide bar 3 by a slide 6 and rests with the opposite end on guide bar 2.

A sensing head 7 is mounted on cursor 5. If this head is made to follow curve 8 which is to be recorded in a program, the corresponding movements of cursor 5 are transmitted to two rotary pulse generators 9 and 10 which convert the movements into pulse signals transmitted to the recorder 13 through the electrical connections 11 and 12 which are illustrated in schematic form.

Recorder 13 comprises a microcomputer and a recording head writing on a magnetic tape which serves as a memory. The microcomputer effects a first conversion of the signals furnished by the pulse generators. Later, reading of the magnetic tape will enter the cutting program into a second microcomputer installed with a cutting machine. That is the information on the magnetic tape will be read into the memory of the second microcomputer associated with the cutting machine which must have a memory with sufficient capacity to store all information regarding the contour and the speed which is stored in the magnetic tape. The microcomputer in recorder 13, on the other hand, requires only a comparatively small memory, as it does not have to store the entire cutting program but needs only to process successive sequences, corresponding, for example, to the interpretation of eight signals pertaining to the trajectory and speed.

The cutting contour which is to be programmed can be supplied in any suitable form. The simplest form is drawn directly on a paper sheet 16, for example a print or a drawing on bristol board. Cursor 5 can be moved by hand along curve 8. It is also possible, however, to use an automatic follower. Such followers equipped with photoelectric sensors are known. (See for example the disclosure in German Pat. PS No. 15 63 770).

In FIG. 1 an automatic follower for curve 8 is shown. The device comprises a control box 18 with power supplied by head 7 and located on cursor 5. A first motor 19 moves carriage 4 in the X direction and a second motor 20 moves cursor 5 in the Y direction. As shown in FIGS. 2 and 3, motors 19 and 20 are equipped with pinions 21 engaging racks 22 located along guide bars 3 and 4, respectively. Control box 18 comprises an electronic calculating device which transmits to drive motors 19 and 20 the instructions for movement which are required to keep sensing head 7 on curve 8.

Rotary pulse generator 9 is mounted on slide 6 supporting carriage 4 by way of an arm 23 which pivots freely by means of sleeve 24 around vertical shaft 25 mounted on plate 26. Rotary pulse generator 9 is commercially available in the form of a unit comprising a rotary shaft 28 and containing the elements for generating electronic signals.

Driving shafts 28 carries a cylindrical driving roller 29 which comprises a ferromagnetic material and the periphery of which makes contact with a lateral track of coordinate guide bar 3. A cylindrical housing 30 is mounted on shaft 28 above roller 29 and encloses coil 31. Coil 31 generates a magnetic field which presses roller 29 against guide bar 3 for creating the necessary driving force. Coil 31 is supplied with electric power through a collector 32 and brushes which are not shown. Roller 29 is fastened to shaft 28 by means of screw 34 and can therefore be easily removed and replaced by another roller with a larger or smaller diameter.

Generator 10 is constructed in the same manner as is generator 9.

FIG. 3 illustrates a further embodiment of the invention which eliminates the necessity of changing the driving roller to vary the cutting program and makes possible continuous adjustment of the rotating speed of shaft 28 by use of a conical roller 36. The track of guide bar 3' has an inclined contact surface so that roller 36 may make contact with the track over its entire height. Arm 23 swivels freely on sleeve 24 around shaft 38 which at its upper part has threaded portion 39 engaging the support plate 26'. The vertical position of shaft 38 can thus be adjusted by means of a knurled knob 41 and the shaft can be locked in the desired position by means of a counternut 42.

We claim:

1. A Cartesian coordinate driving table for entering a program into a memory of an automatically controlled machine, the table having a ferromagnetic guide bar extending in the X direction, a ferromagnetic guide bar extending in the Y direction, a cursor, a first rotary pulse generator responsive to movement of the cursor in the X direction and a second rotary pulse generator responsive to movement of the cursor in the Y direction, the improvement comprising in having a carriage slidable along the guide bar extending in the X direction, in that said first rotary generator is mounted on said carriage, in that said guide bar extended in the Y direction is mounted on said carriage, in that said cursor is slidable along said guide bar extending in the Y direction, in that said second pulse generator is mounted on said cursor, in that each of said pulse generators has a rotatable shaft including a driving roller having a magnet thereon contacting a guide bar with a roller being driven by frictional engagement with a guide bar, and in that the driving roller of at least one pulse generator is interchangeable with a roller of different diameter for tracing a coordinate which deviates along at least one of the coordinates from the pattern to be reproduced.

2. A tracing table according to claim 1 the improvement further characterized in that the driving rollers are cylindrical.

3. A tracing table according to claim 1 further characterized in that the surfaces of the driving rollers are rough.

4. A tracing table according to claim 1 further characterized in having a sensing head on said cursor adapted to by guided by hand along the outline of a pattern to be reproduced.

5. A tracing table according to claim 1 further characterized in having a sensing head on said cursor and including two motors whereby said sensing head may automatically follow along the outline of a pattern to be reproduced.

6. A tracing table according to claim 5 further characterized in that said sensing head has photoelectrical sensors.

7. A tracing table according to claim 1 further characterized in that the driving rollers are interchangeable with rollers of different size whereby two programs may be recorded for cutting a pair of glass sheets which are to be bent for use in a sheet of laminated glass.

* * * * *